(12) United States Patent
Wang et al.

(10) Patent No.: US 10,652,262 B2
(45) Date of Patent: May 12, 2020

(54) DATA FLOW FORWARDING ABNORMALITY DETECTION METHOD AND SYSTEM, AND CONTROLLER

(71) Applicant: HUAWEI TECHNOLOGIES CO., LTD., Shenzhen, Guangdong (CN)

(72) Inventors: Donghui Wang, Shenzhen (CN); Yadong Zhou, Xi'an (CN); Chengchen Hu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 16/130,719

(22) Filed: Sep. 13, 2018

(65) Prior Publication Data

US 2019/0014139 A1 Jan. 10, 2019

Related U.S. Application Data

(63) Continuation of application No. PCT/CN2016/111137, filed on Dec. 20, 2016.

(30) Foreign Application Priority Data

Mar. 15, 2016 (CN) .......................... 2016 1 0147518

(51) Int. Cl.
*H04L 29/06* (2006.01)
*H04L 12/755* (2013.01)
(Continued)

(52) U.S. Cl.
CPC ........ *H04L 63/1425* (2013.01); *H04L 43/026* (2013.01); *H04L 43/16* (2013.01);
(Continued)

(58) Field of Classification Search
CPC ............. H04L 63/1415; H04L 63/1458; H04L 63/1441; H04L 2463/141
See application file for complete search history.

(56) References Cited

U.S. PATENT DOCUMENTS

2009/0271865 A1* 10/2009 Jiang .................. H04L 63/1425
726/23
2010/0284282 A1* 11/2010 Golic .................. H04L 43/022
370/242

FOREIGN PATENT DOCUMENTS

CN 1921422 A 2/2007
CN 104580173 A 4/2015
(Continued)

OTHER PUBLICATIONS

Garg et al., "A Comparative Study for Accuracy of Anomaly Detection Methods of Adaptive Flow Counting in SDN," Proceedings of 2015 RAECS UIET Panjab University Chandigarh, Dec. 21-22, 2015, 4 pages.

(Continued)

*Primary Examiner* — Dao Q Ho
(74) *Attorney, Agent, or Firm* — Fish & Richardson P.C.

(57) ABSTRACT

The present disclosure relates to a data flow forwarding abnormality detection method. In one example method, a switching device through which a to-be-detected data flow passes is determined by a controller. At least one flow entry in the switching device that matches the to-be-detected data flow is obtained. The at least one flow entry comprises actual traffic and a match field. The actual traffic is a value of a counter corresponding to the match field. An overdetermined equation set is established based on the actual traffic and theoretical traffic of a data flow in the switching device that matches the match field. Based on the overdetermined equation set, a determination is made on whether the at least one flow entry is abnormal.

13 Claims, 10 Drawing Sheets

| | | match fields | | | | | | | | | counters | instructions |
|---|---|---|---|---|---|---|---|---|---|---|---|---|
| INGRESS PORT | IN_PHY_PORT | MAC DST | MAC SRC | ETH TYPE | VLAN ID | IP SRC | IP DST | TCP SPORT | TCP DPORT | ... | 0 | actions |
| 0 | 0 | Field content extracted from a data packet header | | | | | | | | | 0 | Output port 1 |

(51) Int. Cl.
 H04L 12/26 (2006.01)
 H04L 12/721 (2013.01)
 H04L 12/741 (2013.01)
 H04L 12/891 (2013.01)
(52) U.S. Cl.
 CPC .......... *H04L 45/021* (2013.01); *H04L 45/38* (2013.01); *H04L 45/745* (2013.01); *H04L 47/41* (2013.01); *H04L 63/1441* (2013.01)

(56) References Cited

FOREIGN PATENT DOCUMENTS

| | | | |
|---|---|---|---|
| CN | 104734954 | A | 6/2015 |
| CN | 104917760 | A | 9/2015 |
| CN | 105162759 | | 12/2015 |
| CN | 105187437 | A | 12/2015 |
| EP | 2924932 | A1 | 9/2015 |
| WO | 2012082988 | A1 | 6/2012 |

OTHER PUBLICATIONS

Office Action issued in Chinese Application No. 201610147518.7 dated Apr. 26, 2019, 11 pages.

Rodrigo Braga et al:"Lightweight DDoS flooding attack detection using NOX/Open Flow", Local Computer Networks(LCN), 2010 IEEE 35th Conference on, IEEE, Oct. 10, 2010, pp. 408-415, XP031986806.

Luo Shibo et al:"A Defense Mechanism for Distributed Denial of Service Attack in Software-Defined Networks", 2015 Ninth International Conference on Frontier of Computer Science and Technology, IEEE, Aug. 26, 2015, pp. 325-329, XP032804606.

Matthew Roughan et al:"IP forwarding anomalies and improving their detection using multiple data sources", Proceedings of ACM SIGCOMM 2004 Workshops:FDNA, Netgames, PINS, NETTS; Portland, Oregon, USA, Aug. 30andSep. 3, 2004, Sep. 3, 2004, pp. 307-312, XP058348610.

Ying Zhang:"An adaptive flow counting method for anomaly detection in SDN", Proceedings of the Ninth ACM Conference on Emerging Networking Experiments and Technologies, Conext'13, Jan. 31, 2013, pp. 25-30, XP055535521.

Extended European Search Report issued in European Application No. 16894231.6 on Jan. 2, 2019, 6 pages.

International Search Report and Written Opinion issued in International Application No. PCT/CN2016/111137 dated Mar. 21, 2017, 9 pages.

* cited by examiner

| | match fields | | | | | | | | | counters | instructions |
|---|---|---|---|---|---|---|---|---|---|---|---|
| INGRESS PORT | IN_PHY_PORT | MAC DST | MAC SRC | ETH TYPE | VLAN ID | IP SRC | IP DST | TCP SPORT | TCP DPORT | | actions |
| 0 | 0 | Field content extracted from a data packet header | | | | | | | ... | 0 | |
| | | | | | | | | | | 0 | Output port 1 |

FIG. 2

DATA FLOW FORWARDING ABNORMALITY DETECTION METHOD AND SYSTEM, AND CONTROLLER

CROSS-REFERENCE TO RELATED APPLICATIONS

This application is a continuation of International Application No. PCT/CN2016/111137, filed on Dec. 20, 2016, which claims priority to Chinese Patent Application No. 201610147518.7, filed on Mar. 15, 2016. The disclosure of the aforementioned applications are hereby incorporated by reference in their entireties.

TECHNICAL FIELD

The present application relates to the computer network communications field, and in particular, to a data flow forwarding abnormality detection method and system, and a controller.

BACKGROUND

Referring to FIG. 1, a Software Defined Network (SDN) network is a new network system structure, which integrates a plurality of control functions of a network into one controller by separating a control plane from a forwarding plane of the network and delivers control information through interactive communication between the controller and switching devices. The switching devices process data flows based on the control information. Specifically, the control information is delivered by using a flow table.

The flow table is a data flow processing rule delivered by the controller to the switching device, and a flow table inside the switching device includes flow entries. Referring to FIG. 2, a basic data structure of a flow entry includes three parts: a match field, counters, and instructions. The match field includes such data packet header information as a data flow ingress port, a source/destination MAC (Media Access Control) address, and a source/destination IP (Internet Protocol) address. When a data flow reaches the switching device, the switching device performs matching on the flow entries inside the switching device based on feature information of a data packet, for example, header information and an ingress port. Once a flow entry is matched, the data packet is processed according to operations specified in the instructions in the flow entry. The operations include, for example, discarding, forwarding, and modifying the data packet. In addition, after the data packet matches the flow entry, the switching device updates the counters corresponding to the flow entry. That is, the switching device may obtain, by using the counters, a quantity of data flows matching each flow entry, namely, actual traffic.

For an SDN architecture network shown in FIG. 1, when an attacker (for example, an attacker 14 in FIG. 1) tampers with a flow entry of a switching device (for example, S5 in FIG. 1) or the flow entry of the switching device is abnormal, a correct path (for example, Host 1→S1→S5→S9→S7→S3→Host 5 shown in FIG. 1) from a source host (for example, the Host 1 in FIG. 1) to a destination host (for example, the Host 5 in FIG. 1) delivered by a controller (for example, a controller 11 in FIG. 1) is tampered with to an incorrect path (for example, Host 1→S1→S5→S10→S7→S3→Host 5 in FIG. 1). The switching device S9 may be a security device, for example, a firewall or an IPS (English name: intrusion prevention system, Chinese name: intrusion prevention system). Due to such tampering performed by the attacker, the data flow bypasses a check performed by the security device. A fundamental reason is that the data flow forwarding rule delivered by the controller is inconsistent with an actual forwarding status of the data flow, and such inconsistency cannot be detected by using a technical means in the prior art.

SUMMARY

Embodiments of the present application provide a data flow forwarding abnormality detection method and system, and a controller, to resolve a problem that detection needs to be performed when a data flow forwarding rule is inconsistent with an actual forwarding status of a data flow due to flow table abnormality.

The following technical solutions are used in the embodiments of the present application to achieve the foregoing objective.

According to a first aspect, a data flow forwarding abnormality detection method is provided. The method specifically includes the following steps:

determining, by a controller, a switching device through which a to-be-detected data flow passes;

obtaining, by the controller, at least one flow entry that matches the data flow and that is in the switching device, where the flow entry includes actual traffic and a match field;

establishing, by the controller, an overdetermined equation set based on the actual traffic and theoretical traffic of a data flow that matches the match field and that is in the switching device; and determining, by the controller based on the overdetermined equation set, whether the at least one flow entry is abnormal.

According to the data flow forwarding abnormality detection method provided in the present application, the controller determines the switching device through which the to-be-detected data flow passes; obtains the at least one flow entry that matches the data flow and that is in the switching device, where the flow entry includes the actual traffic and the match field; and determines, based on the overdetermined equation set, whether the at least one flow entry is abnormal. Based on the mathematical method in this embodiment of the present application, the match field in the flow entry delivered by the controller corresponds to a match field in a flow entry stored in the switching device, the theoretical traffic of the data flow in the switching device and the actual traffic are abstracted as the overdetermined equation set, a square error norm is obtained by using a least square solution of the overdetermined equation set, to determine whether the flow entry is abnormal, and an abnormal flow entry is located, thereby resolving a problem that detection needs to be performed when a data flow forwarding rule is inconsistent with an actual forwarding status of the data flow because the flow table is tampered with.

With reference to the first aspect, in a first possible implementation, the data flow forwarding abnormality detection method includes:

substituting a least square solution of the overdetermined equation set into an unknown number vector side of the overdetermined equation set, to obtain an updated constant term vector;

obtaining a square error norm based on a constant term vector of the overdetermined equation set and the updated constant term vector; and comparing the square error norm with a first threshold to determine whether a flow entry is abnormal.

With reference to the first possible implementation of the first aspect, in a second possible implementation, the data flow forwarding abnormality detection method includes:

generating a difference vector by calculating differences between the updated constant term vector and the constant term vector of the overdetermined equation set, comparing each difference in the difference vector with a second threshold, and determining an abnormal flow entry in flow entries corresponding to one or more differences that exceed the second threshold and that are in the differences.

With reference to the first aspect, in a third possible implementation, the flow entry further includes an aggregation flag, and the aggregation flag is used to indicate whether the flow entry is an aggregated flow entry; and the calculation unit is further configured to:

determining, according to the aggregation flag, whether the flow entry is an aggregated flow entry;

establishing, based on a determining result of the flow entry, an equation by equaling the theoretical traffic of the data flow that matches the match field and that is in the switching device to the actual traffic; and combining equations established based on a plurality of match fields, to generate the overdetermined equation set.

With reference to the third possible implementation of the first aspect, in a fourth possible implementation, the data flow forwarding abnormality detection method includes:

when a matched data flow can be found by using the match field, if it is determined that the flow entry is not an aggregated flow entry, indicating that the match field matches one data flow, establishing an equation by equaling theoretical traffic of the data flow that matches the match field and that is in the switching device to the actual traffic; or if it is determined that the flow entry is an aggregated flow entry, indicating that the match field matches a plurality of data flows, establishing an equation by equaling a sum of theoretical traffic of the plurality of data flows that match the match field and that are in the switching device to the actual traffic.

With reference to any one of the first aspect and the first to the fourth possible implementations of the first aspect, in a fifth possible implementation, the data flow forwarding abnormality detection method includes:

establishing the overdetermined equation set as $$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = (c_1, c_2, c_3, \ldots, c_q)^T.$$

According to a second aspect, a controller is provided. The controller is configured to perform the method according to any one of the first aspect or the possible implementations of the first aspect. The controller includes:

a detection unit, configured to determine a switching device through which a to-be-detected data flow passes;

an obtaining unit, configured to obtain at least one flow entry that matches the data flow and that is in the switching device determined by the detection unit, where the flow entry includes actual traffic and a match field;

a calculation unit, configured to establish an overdetermined equation set based on the actual traffic and theoretical traffic of a data flow that matches the match field and that is in the switching device determined by the detection unit; and a determining unit, configured to determine, based on the overdetermined equation set established by the calculation unit, whether the at least one flow entry is abnormal.

The controller in the present application may be configured to perform the method procedure according to the first aspect, and therefore, for technical effects that can be obtained by the controller, refer to the method according to the first aspect. Details are not described in the present application again.

With reference to the second aspect, in a first possible implementation, the calculation unit is further configured to:

substitute a least square solution of the overdetermined equation set into an unknown number vector side of the overdetermined equation set, to obtain an updated constant term vector;

obtain a square error norm based on a constant term vector of the overdetermined equation set and the updated constant term vector; and compare the square error norm with a first threshold to determine whether a flow entry is abnormal.

With reference to the first possible implementation of the second aspect, in a second possible implementation, the determining unit is further configured to:

generate a difference vector by calculating differences between the updated constant term vector and the constant term vector of the overdetermined equation set, compare each difference in the difference vector with a second threshold, and determine an abnormal flow entry in flow entries corresponding to one or more differences that exceed the second threshold and that are in the differences.

With reference to the second aspect, in a third possible implementation, the flow entry further includes an aggregation flag, and the aggregation flag is used to indicate whether the flow entry is an aggregated flow entry; and that the calculation unit is further configured to establish an overdetermined equation set based on the actual traffic and theoretical traffic of a data flow that matches the match field and that is in the switching device includes:

determining, according to the aggregation flag, whether the flow entry is an aggregated flow entry;

establishing, based on a determining result of the flow entry, an equation by equaling the theoretical traffic of the data flow that matches the match field and that is in the switching device to the actual traffic; and combining equations established based on a plurality of match fields, to generate the overdetermined equation set.

With reference to the third possible implementation of the second aspect, in a fourth possible implementation, the calculation unit is further configured to:

when a matched data flow can be found by using the match field, if it is determined that the flow entry is not an aggregated flow entry, indicating that the match field matches one data flow, establish an equation by equaling theoretical traffic of the data flow that matches the match field and that is in the switching device to the actual traffic; or if it is determined that the flow entry is an aggregated flow entry, indicating that the match field matches a plurality of data flows, establish an equation by equaling a sum of theoretical traffic of the plurality of data flows that match the match field and that are in the switching device to the actual traffic.

With reference to any one of the second aspect or the possible implementations of the second aspect, in a fifth possible implementation, the calculation unit is further configured to:

establish the overdetermined equation set as $$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = (c_1, c_2, c_3, \ldots, c_q)^T.$$

According to a third aspect, a controller is provided. The controller is configured to perform the method according to any one of the first aspect or the possible implementations of the first aspect. The controller includes a processor, a memory, and a bus. The processor and the memory are connected by using the bus and complete mutual communication. The processor is configured to execute program code in the memory to perform the following operations:

determining a switching device through which a to-be-detected data flow passes;

obtaining at least one flow entry that matches the data flow and that is in the switching device, where the flow entry includes actual traffic and a match field;

establishing an overdetermined equation set based on the actual traffic and theoretical traffic of a data flow that matches the match field and that is in the switching device; and determining, based on the overdetermined equation set, whether the at least one flow entry is abnormal.

The controller in the present application may be configured to perform the method procedure according to the first aspect, and therefore, for technical effects that can be obtained by the controller, refer to the method according to the first aspect. Details are not described in the present application again.

With reference to the third aspect, in a first possible implementation, the processor is further configured to:

substitute a least square solution of the overdetermined equation set into an unknown number vector side of the overdetermined equation set, to obtain an updated constant term vector;

obtain a square error norm based on a constant term vector of the overdetermined equation set and the updated constant term vector; and compare the square error norm with a first threshold to determine whether a flow entry is abnormal.

With reference to the first possible implementation of the third aspect, in a second possible implementation, the processor is further configured to:

generate a difference vector by calculating differences between the updated constant term vector and the constant term vector of the overdetermined equation set, compare each difference in the difference vector with a second threshold, and determine an abnormal flow entry in flow entries corresponding to one or more differences that exceed the second threshold and that are in the differences.

With reference to the third aspect, in a third possible implementation, the processor is further configured to:

the flow entry further includes an aggregation flag, and the aggregation flag is used to indicate whether the flow entry is an aggregated flow entry; and the establishing an overdetermined equation set based on the actual traffic and theoretical traffic of a data flow that matches the match field and that is in the switching device includes:

determining, according to the aggregation flag, whether the flow entry is an aggregated flow entry;

establishing, based on a determining result of the flow entry, an equation by equaling the theoretical traffic of the data flow that matches the match field and that is in the switching device to the actual traffic; and combining equations established based on a plurality of match fields, to generate the overdetermined equation set.

With reference to the third possible implementation of the third aspect, in a fourth possible implementation, the processor is further configured to:

when a matched data flow can be found by using the match field, if it is determined that the flow entry is not an aggregated flow entry, indicating that the match field matches one data flow, establish an equation by equaling theoretical traffic of the data flow that matches the match field and that is in the switching device to the actual traffic; or if it is determined that the flow entry is an aggregated flow entry, indicating that the match field matches a plurality of data flows, establish an equation by equaling a sum of theoretical traffic of the plurality of data flows that match the match field and that are in the switching device to the actual traffic.

With reference to any one of the third aspect or the possible implementations of the third aspect, in a fifth possible implementation, the overdetermined equation set is $$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = (c_1, c_2, c_3, \ldots, c_q)^T.$$

According to a fourth aspect, a data flow forwarding abnormality detection system is provided. The data flow forwarding abnormality detection system includes the controller according to any one of the second aspect or the possible implementations of the second aspect, or includes the controller according to any one of the third aspect or the possible implementations of the third aspect.

The data flow forwarding abnormality detection system provided in the embodiments of the present application includes the controller according to any one of the second aspect or the possible implementations of the second aspect, or includes the controller according to any one of the third aspect or the possible implementations of the third aspect. Therefore, for technical effects that can be obtained by the data flow forwarding abnormality detection system, refer to the technical effects of the controller. Details are not described herein again.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 2 is a schematic structural diagram of data of a flow entry according to an embodiment of the present application;

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
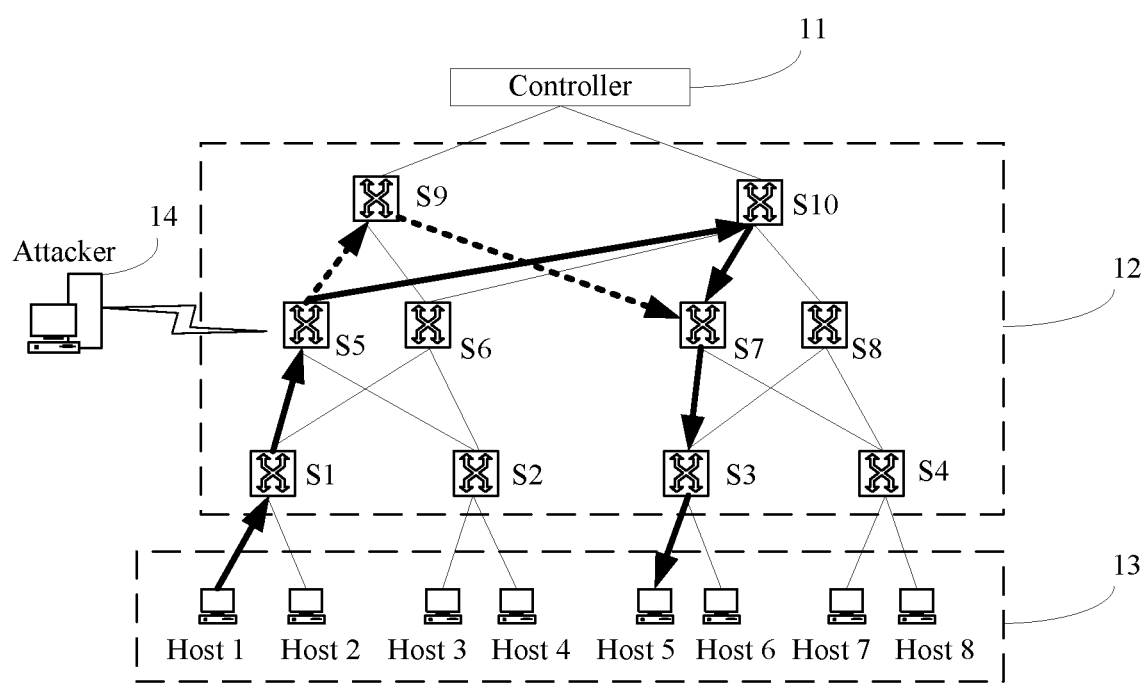
FIG. 1 is a schematic structural diagram of an SDN architecture network whose flow entry is tampered with according to an embodiment of the present application.

Embodiments of the present application provide a data flow forwarding abnormality detection system. Referring to FIG. 1, the data flow forwarding abnormality detection system includes a controller 11, a switching device 12, and a host 13. The embodiments of the present application are mainly applied to an SDN/OpenFlow (Chinese name: OpenFlow) network. It is required that in a path through which a data flow passes, at least one switching device is not attacked and can operate normally. A traffic ingress of the network can accurately match all data flows, that is, no flow entries are aggregated in an ingress switching device. In addition, clocks of switching devices in the network are synchronous, ensuring that read flow table information is consistent.

Figure 3:
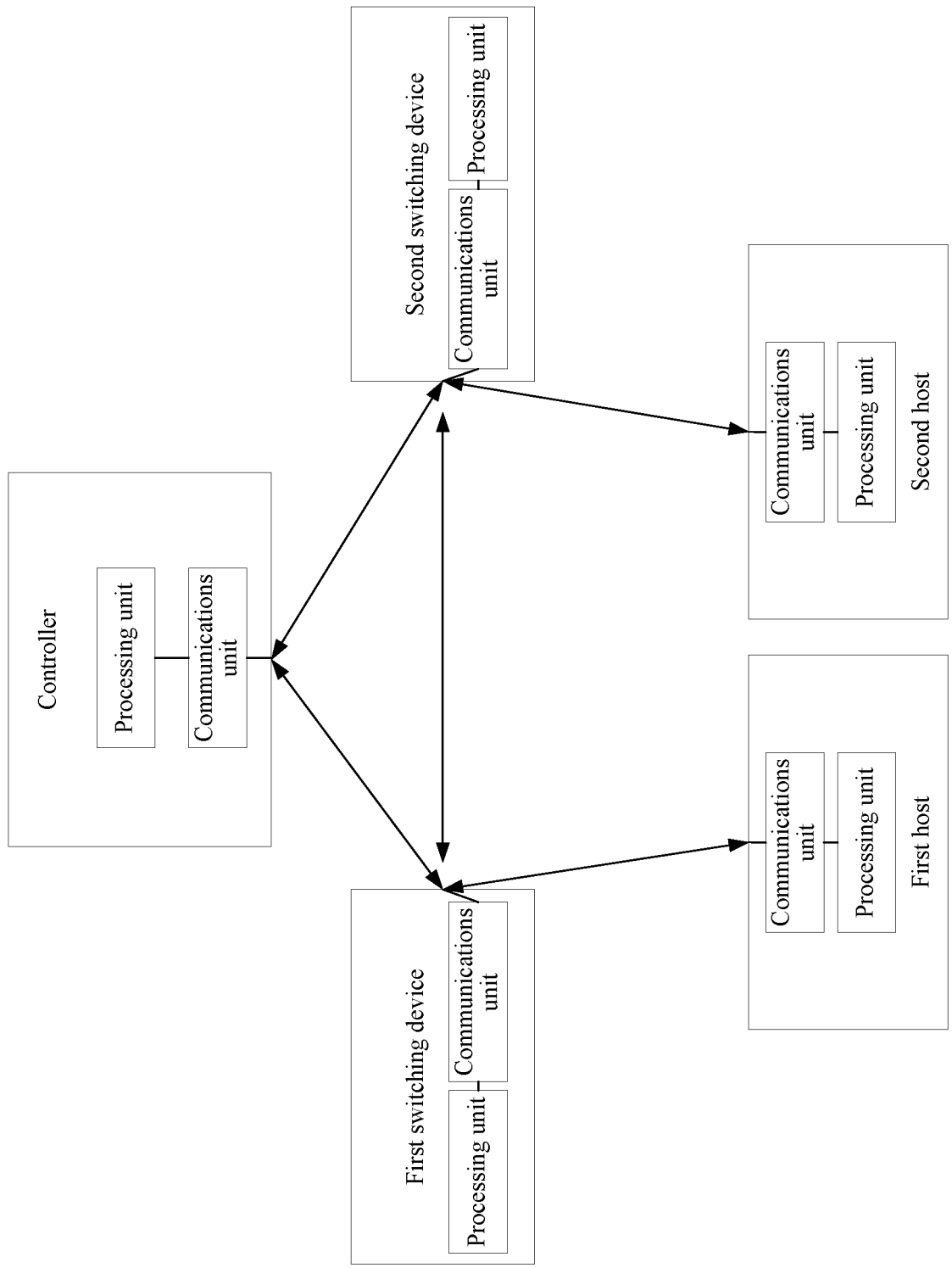
FIG. 3 is a simplified schematic diagram of an SDN architecture network according to an embodiment of the present application.

To simplify description below, referring to FIG. 3, a data flow transmission mode of an SDN architecture network is described by using an example in which the SDN architecture network has one controller, two switches, and two hosts. First, the controller, a first switching device, and a second switching device are connected to each other by using the network. The network may be the Internet or a local area network. A first host and a second host are not directly connected but are connected by using the first switching device and the second switching device. In addition, the controller does not directly communicate with the hosts. The controller has a processing unit and a communications unit, the first switching device and the second switching device also each have a processing unit and a communications unit, and the first host and the second host also each have a processing unit and a communications unit. Each device accesses the network by using the communications unit, and the processing unit of each device is configured to process data flow information. Before the first host sends a data flow to the second host, the controller first delivers a flow table to the first switching device and the second switching device to indicate a data flow routing path. Subsequently, the data flow sent by the first host is first sent to the first switching device, then forwarded to the second switching device based on the flow table in the first switching device, and then forwarded to the second host based on the flow table in the second switching device. In this way, an entire data flow forwarding process is completed.

A main idea of the present application lies in that: Because an attacker cannot obtain a control permission of each network device, a quantity of switching devices tampered with by the attacker should be a part of a quantity of switching devices in the correct path delivered by the controller. Therefore, for a relatively complex network shown in FIG. 1, if the switching devices are not tampered with, when a data flow flows through a path s1→s5→s9→s7→s3, statistics values of the data flow in all the switching devices should be consistent. However, when the switching device s5 is tampered with and a path through which the data flow actually flows is s1→s5→s10→s7→s3, there is a traffic error in the statistics values of the data flow in all the switching devices in the original correct path s1→s5→s9→s7→s3. In this solution, a method is provided for locating an abnormal switching device and flow entry by analyzing traffic errors of a data flow in the switching devices in each path in all cases.

Figure 4:
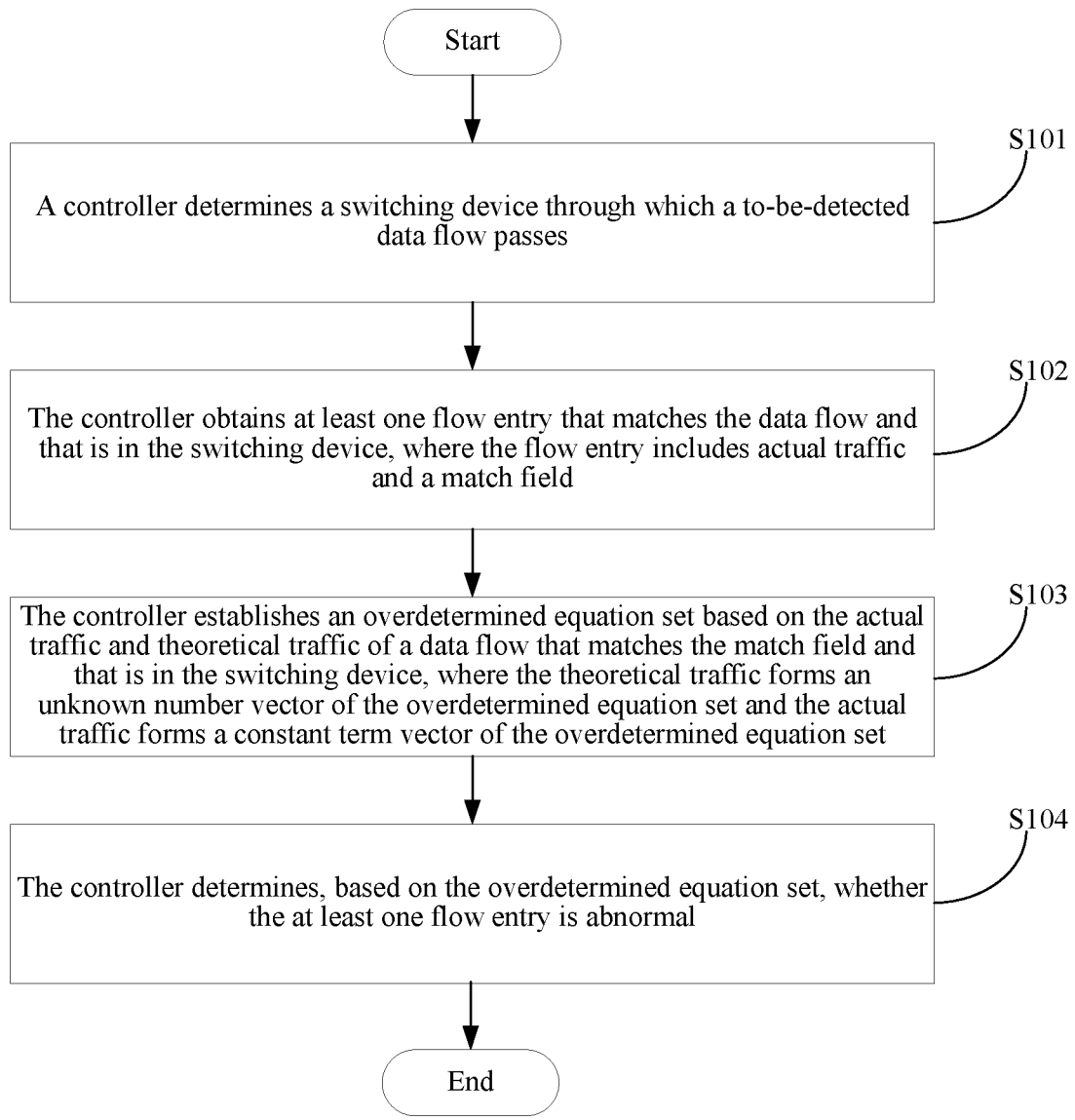
FIG. 4 is a schematic flowchart of a data flow forwarding abnormality detection method according to an embodiment of the present application.

An embodiment of the present application provides a data flow forwarding abnormality detection method. Referring to FIG. 4, the method includes the following steps.

S101. A controller determines a switching device through which a to-be-detected data flow passes.

Based on a delivered flow table corresponding to each data flow, the controller can learn of each switching device through which each to-be-detected data flow theoretically flows.

S102. The controller obtains at least one flow entry that matches the data flow and that is in the switching device, where the flow entry includes actual traffic and a match field, and the actual traffic is a value of a counter that is in the switching device and that is corresponding to a data flow that corresponds to the match field.

The flow table includes at least one flow entry. The controller obtains a locally stored flow table from the switching device, to obtain at least one flow entry in the flow table and correspondingly obtain a match field and a counter in the at least one flow entry. As shown in FIG. 2, each flow entry corresponds to one match field and one counter. Therefore, actual traffic of a matched data flow corresponding to a match field in the switching device can be learned of by using the counter.

Because a quantity of data flows is usually less than a quantity of flow entries, zero or one or more corresponding data flows can be found by using the match field. If no data flow corresponding to the match field flows through the switching device, zero corresponding data flow can be found by using the match field. If it is determined that a data flow corresponding to the match field flows through the switching device, there are two cases: For a match field in a non-aggregated flow entry, one corresponding data flow can be found by using one match field; for a match field in an aggregated flow entry, a plurality of corresponding data flows can be found by using the same match field. For example, it is assumed that an IP address of a match field in an aggregated flow entry is 10.0.0.0/8, all data flows whose data packet headers include an IP address 10.*.*.* can match the match field.

It is set that actual traffic, of zero or one or more corresponding data flows corresponding to the match field, generated in the switching device is c.

S103. The controller establishes an overdetermined equation set based on the actual traffic and theoretical traffic of a data flow that matches the match field and that is in the switching device, where the theoretical traffic forms an unknown number vector of the overdetermined equation set and the actual traffic forms a constant term vector of the overdetermined equation set.

The flow table delivered by the controller includes a flow entry, and the flow entry includes a match field. In a normal case in which the switching device is not tampered with and attacked, one data flow corresponds to a match field in one flow entry, and correspondingly, corresponding match fields in all switching devices through which the data flow flows should be the same.

In addition, assuming that theoretical traffic of a data flow is m, theoretical traffic generated by the data flow in each switching device through which the data flow theoretically flows is also m.

A corresponding data flow and theoretical traffic m of the data flow in each switching device can be found by using a match field.

For each flow entry in the switching device, the controller may search for a same match field in the flow entry in a delivered flow table by using the match field of the flow entry, find a corresponding data flow based on the match field, then find the theoretical traffic m of the data flow in the switching device, and establish an equation by equaling the theoretical traffic m to the actual traffic c.

Specifically, if a corresponding data flow cannot be found by using one match field, an equation $0*m=c$ may be formulated. In a case of a non-aggregated flow entry, and when one corresponding data flow can be found by using one match field, an equation $m=c$ may be formulated. In a case of an aggregated flow entry, when a plurality of corresponding data flows can be found by using one match field, an equation $m1+m2+\ldots+mk=c$ may be formulated, where k represents that k corresponding data flows can be found by using one match field.

For example, at least one equation below may be formulated:

$$0*m1=c1$$

$$m1+m2+\ldots+mk=c2$$

Because each flow entry corresponds to one match field, each flow entry corresponds to one equation.

The controller constructs an equation set by using all equations, uses theoretical traffic $m1, m2, \ldots$ of all equations as an unknown number part of the equation set, and uses actual traffic $c1, c2, \ldots$ of all the equations as a constant term part of the equation set. The equation set is represented by $AM=C$ in a form of vectors. A is a coefficient matrix of the equation set, M is an unknown number vector formed by the theoretical traffic, and C is a constant term vector formed by the actual traffic.

Because a quantity of data flows is usually less than a quantity of flow entries, the equation set is an overdetermined equation set.

S104. The controller determines, based on the overdetermined equation set, whether the at least one flow entry is abnormal.

Because the overdetermined equation set has no fixed solution, a least square solution $m*$ is obtained by solving the overdetermined equation set, and the least square solution $m*$ is an approximate solution.

The least square solution $m*$ is substituted into the unknown number vector side of the original overdetermined equation set to obtain an updated constant term vector $C*$, and a square error norm is obtained based on the updated constant term vector $C*$ and the original constant term vector C. If the square error norm is greater than a first threshold, it may be wholly determined that the flow entry that constructs the equation is abnormal.

Further, differences between $C*$ and C are calculated to obtain a difference vector $C*-C$. Based on each difference of the difference vector $C*-C$, a flow entry that corresponds to one or more relatively large differences exceeding a second threshold is most probably an abnormal flow entry.

According to the data flow forwarding abnormality detection method provided in the present application, the controller determines the switching device through which the to-be-detected data flows; obtains the at least one flow entry that matches the data flow and that is in the switching device, where the flow entry includes the actual traffic and the match field, and the actual traffic is the value of the counter corresponding to the match field; establishes the overdetermined equation set based on the actual traffic and the theoretical traffic of the data flow that matches the match field and that is in the switching device, where the theoretical traffic forms the unknown number vector of the overdetermined equation set and the actual traffic forms the constant term vector of the overdetermined equation set; and determines, based on the overdetermined equation set, whether the at least one flow entry is abnormal. Based on the mathematical method in this embodiment of the present application, the match field in the flow entry delivered by the controller corresponds to a match field in a flow entry stored in the switching device, the theoretical traffic of the data flow in the switching device and the actual traffic are abstracted as the overdetermined equation set, the square error norm is obtained by using the least square solution of the overdetermined equation set, to determine whether the flow entry is abnormal, and an abnormal flow entry is located, thereby resolving a problem that detection needs to be performed when a data flow forwarding rule is inconsistent with an actual forwarding status of the data flow because the flow table is tampered with.

Figure 5:
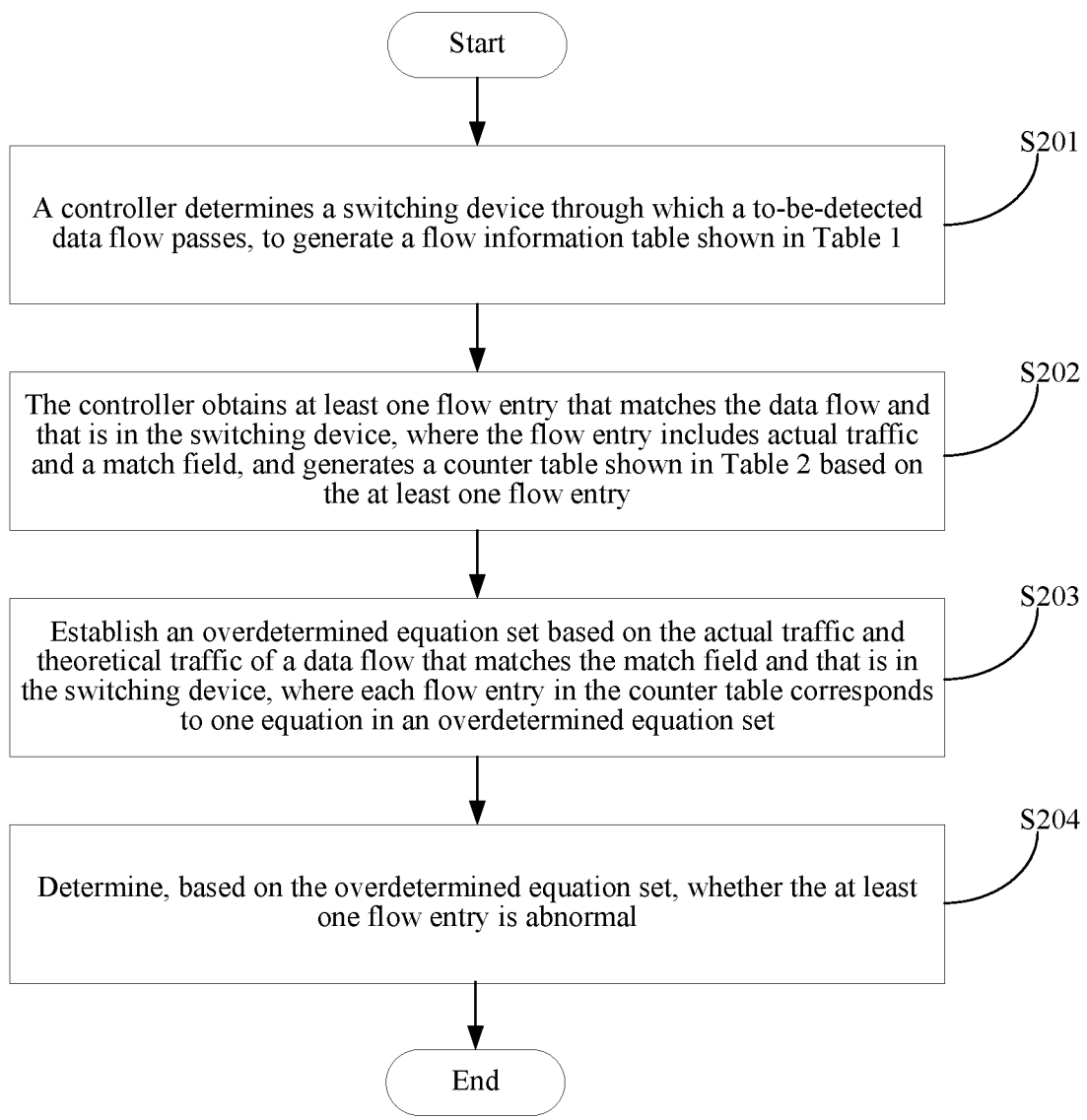
FIG. 5 is a schematic flowchart of another data flow forwarding abnormality detection method according to an embodiment of the present application.

Referring to FIG. 5, an embodiment of the present application provides a data flow forwarding abnormality detection method, and the method specifically includes the following steps.

S201. A controller determines a switching device through which a to-be-detected data flow passes, to generate a flow information table shown in Table 1.

Based on a delivered flow table corresponding to each data flow, the controller obtains each switching device through which each to-be-detected data flow theoretically flows. To complete communication between two sites, the controller communicates with each switch on a link to complete adding of the flow table. Therefore, the controller may learn of in advance all switching devices through which the data flow flows on the link.

Based on the flow table corresponding to each data flow and at least one switching device through which the data flow theoretically passes, the controller generates a flow information table (English name: flow info table) shown in Table 1, and updates each entry in the flow information table in real time based on a dynamic change of the flow table. The flow information table includes a corresponding match field (a match field in Table 1) in each switching device through which each data flow flows, and theoretical traffic (theoretical traffic in Table 1) of each data flow in each switching device through which the data flow flows.

In addition, in Table 1, a flow sequence number refers to a sequence number of a data flow; theoretical traffic represents theoretical traffic of each data flow, and theoretical traffic values of different data flows are represented by $m_1$, $m_2$, $m_3$, and the like; a match field represents a match field of a flow entry shown in FIG. 2, SrcIP refers to a source IP address, DstIP refers to a destination IP address; a path represents names of all switching devices through which the data flow passes and the names are represented by S1, S5, and the like; and a switch number in the flow entry represents a name of each switching device through which the data flow flows, and flow entry content in the flow entry represents content in an instruction of the flow entry shown FIG. 2, and ellipses " . . . " in the table represent other omitted content.

It may be learned from the table that one data flow corresponds to a match field in one flow entry; correspondingly, match fields corresponding to the data flow in all switching devices through which the data flow flows are the same; and theoretical traffic of the data flow generated in the switching devices through which the data flow flows is the same.

For example, a match field corresponding to a data flow whose flow sequence number is 1 is SrcIP: 10.0.0.1, DstIP: 10.0.0.4, . . . ; corresponding match fields of the data flow in switching devices S1, S5, S9, S7, and S3 through which the data flow flows are the same; and theoretical traffic of the data flow generated in switching devices S1, S5, S9, S7, and S3 through which the data flow flows is the same and is $m_1$.

TABLE 1

| Flow sequence number | Theo-retical traffic | Match field | Switch number | Flow entry content | Path |
|---|---|---|---|---|---|
| 1 | m1 | SrcIP: 10.0.0.1, DstIP: 10.0.0.4, . . . | S1 S5 S9 S7 S3 | . . . . . . . . . . . . . . . | S1, S5, S9, S7, S3 |
| 2 | m2 | SrcIP: 10.0.0.2, DstIP: 10.0.0.3, . . . | | . . . | S1, S5, S2 |
| 3 | m3 | SrcIP: 10.0.0.2, DstIP: 10.0.0.3, . . . | | . . . | S1, S5, S2 |
| . . . | . . . | . . . | | . . . | . . . |

S202. The controller obtains at least one flow entry that matches the data flow and that is in the switching device, where the flow entry includes actual traffic and a match field, and the actual traffic is a value of a counter that is in the switching device and that is corresponding to a data flow that corresponds to the match field; and generates a counter table (English name: counter table) shown in Table 2 based on the at least one flow entry.

The generated counter table includes main content of the flow entry shown in FIG. 2, and specifically includes a counter and a match field therein. A value of the counter is represented by $c_1$ $c_2$, and the like, and the match field in the counter table and a match field in the flow information table have a same format, so that the match field in the flow information table can be found by using the match field in the counter table. An ellipsis " . . . " in the table represents other omitted content.

The flow entry in Table 2 further includes an aggregation flag, used to indicate whether the flow entry is an aggregated flow entry. A value of the aggregation flag includes: False (Chinese name: false), indicating that the flow entry is not an aggregated flow entry; and True (Chinese name: true), indicating that the flow entry is an aggregated flow entry.

TABLE 2

| Switch number | Flow entry | | |
|---|---|---|---|
| | Match field | Counter | Aggregation flag |
| S1 | SrcIP: 10.0.0.1, DstIP: 10.0.0.4, . . . | c1 | False |
| | SrcIP: 10.0.0.2, DstIP: 10.0.0.3, . . . | c2 | True |
| S2 | SrcIP: 10.0.0.2, DstIP: 10.0.0.4, . . . | c3 | True |
| . . . | . . . | . . . | . . . |
| . . . | . . . | . . . | . . . |

S203. Establish an overdetermined equation set based on the actual traffic and theoretical traffic of a data flow that matches the match field and that is in the switching device, where each flow entry in the counter table corresponds to one equation in the overdetermined equation set.

Figure 6:
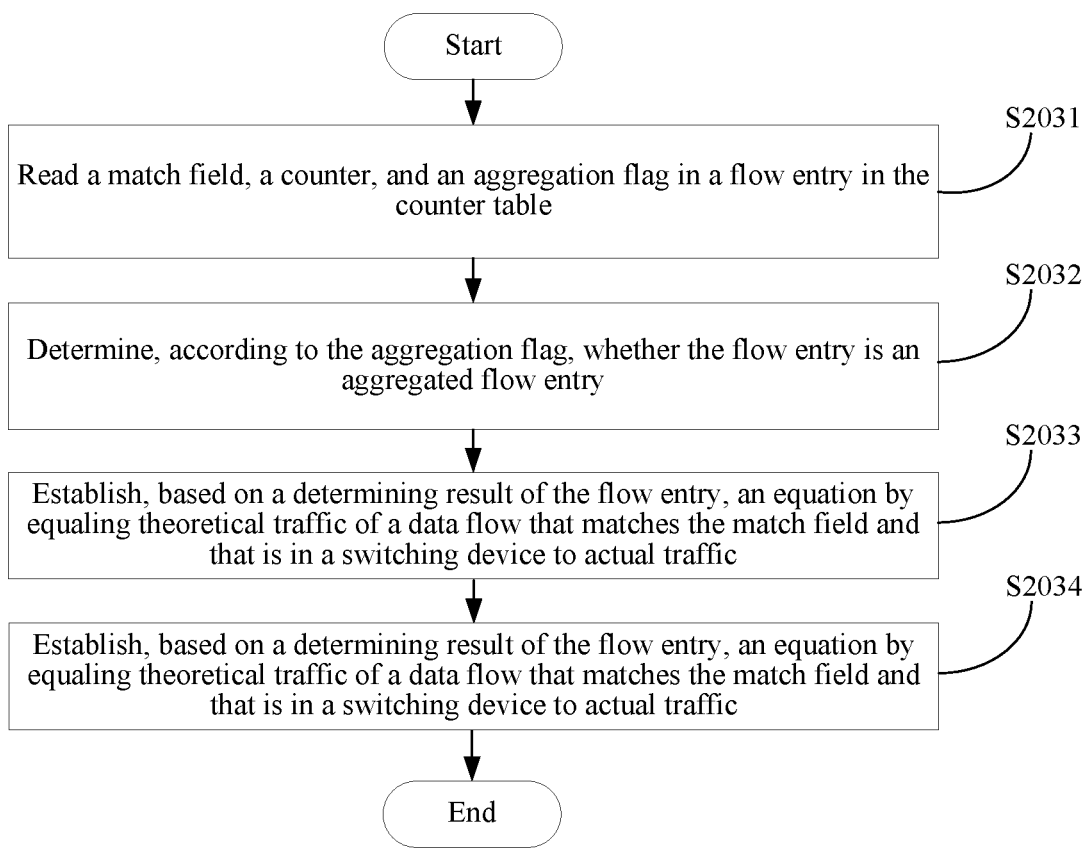
FIG. 6 is a schematic flowchart of establishing an equation by using theoretical traffic of a data flow in a same match field and actual traffic according to an embodiment of the present application.

For each flow entry in the counter table, the controller may search for a same match field in the flow entry in the flow information table by using the match field of the flow entry, find a corresponding data flow based on the match field, then find theoretical traffic m of the data flow in the switching device, and establish an equation by equaling the theoretical traffic m to actual traffic c. Specifically, referring to FIG. 6, step S203 includes step S2031 to step S2034.

S2031. Read a match field, a counter, and an aggregation flag in a flow entry in the counter table.

For example, the first flow entry in the counter table is read, that is, a match field of a switching device S1 is SrcIP: 10.0.0.1, DstIP: 10.0.0.4, . . . , a counter, that is, actual traffic is c1, and an aggregation flag is False. However, when the second flow entry in the counter table is read in a loop in the next time, it is read that the match field of the switching device S1 is "SrcIP:10.0.0.2, DstIP:10.0.0.3, . . . ", the counter, that is, the actual traffic, is c2, and the aggregation flag is True.

S2032. Determine, according to the aggregation flag, whether the flow entry is an aggregated flow entry.

For example, because the aggregation flag of the first flow entry in the counter table is False, the flow entry is not an aggregated flow entry. However, because the aggregation flag in the second flow entry in the counter table is True, the flow entry is an aggregated flow entry.

S2033. Establish, based on a determining result of the flow entry, an equation by equaling the theoretical traffic of the data flow that matches the match field and that is in the switching device to the actual traffic.

Figure 7:
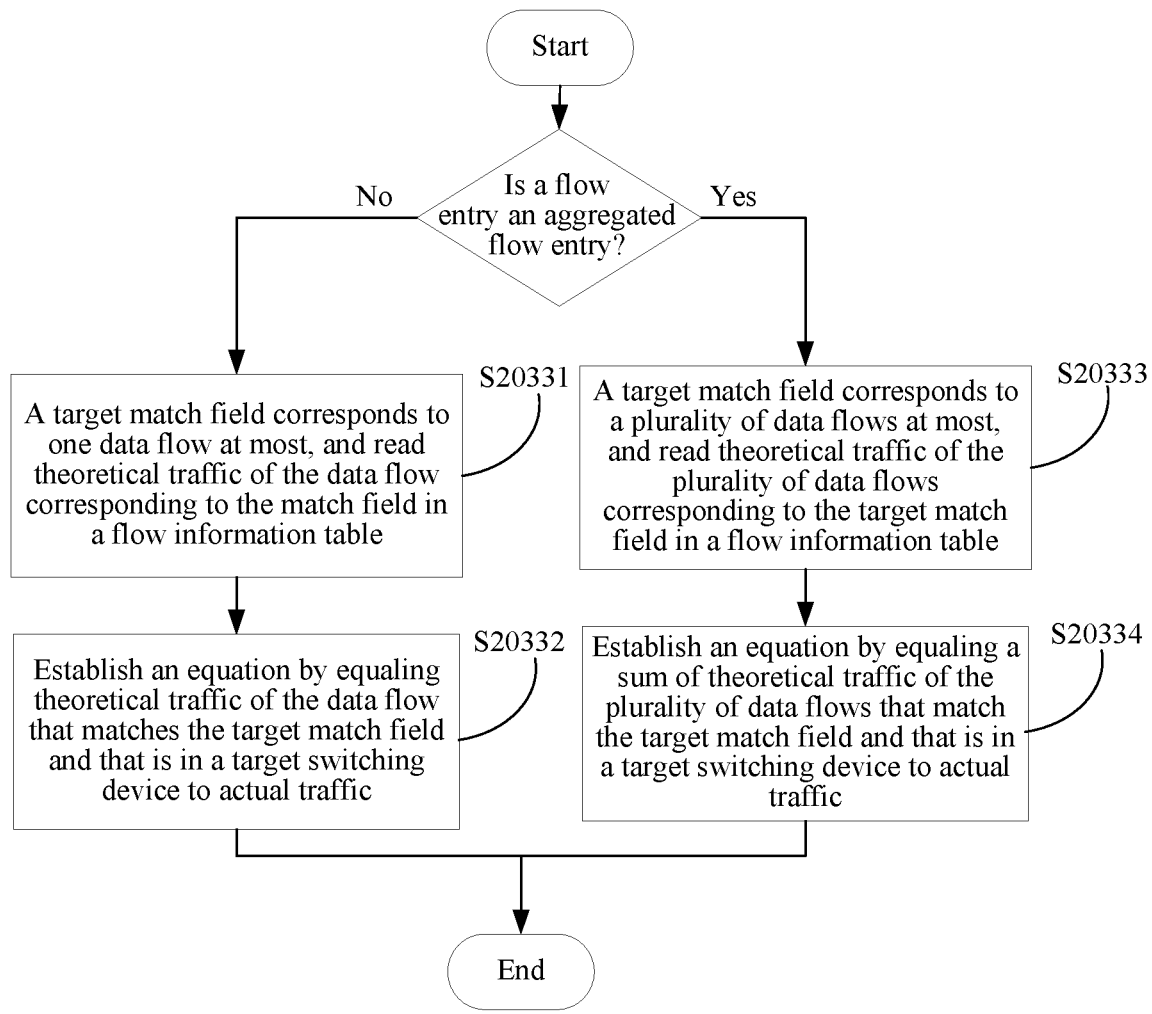
FIG. 7 is a schematic flowchart of establishing an equation based on a determining result of a flow entry according to an embodiment of the present application.

Specifically, referring to FIG. 7, step S2033 includes step S20331 to step S20334. If the flow entry is not an aggregated flow entry, step S20331 is performed; otherwise, step S20333 is performed.

S20331. When a corresponding data flow can be found by using the match field, if it is determined that the flow entry is not an aggregated flow entry, indicating that the match field corresponds to one data flow at most, read theoretical traffic of the data flow corresponding to the match field in a flow information table.

For example, in this embodiment, a data flow whose corresponding flow sequence number is 1 can be found in the flow information table by using a match field "SrcIP: 10.0.0.1, DstIP: 10.0.0.4, . . . ", and theoretical traffic of the data flow is m1.

In addition, when a corresponding data flow cannot be found by using the match field, in this case, a coefficient before the theoretical traffic m is set to 0, that is, 0*m, and subsequently, when an equation set is generated, m herein is expanded.

S20332. If it is determined that the flow entry is not an aggregated flow entry, establish an equation by equaling theoretical traffic of a data flow that matches the match field and that is in the switching device to the actual traffic, and then go to step S2034.

Specifically, the equation is established by equaling theoretical traffic in the flow information table to a corresponding counter (that is, actual traffic) in the counter table.

For example, in this embodiment, an equation m1=c1 may be established by using the match field "SrcIP: 10.0.0.1, DstIP: 10.0.0.4, . . . ".

In addition, if a corresponding data flow cannot be found by using the match field "SrcIP: 10.0.0.1, DstIP: 10.0.0.4, . . . ", an equation 0*m=c1 is formulated.

S20333. When a corresponding data flow can be found by using the match field, if it is determined that the flow entry is an aggregated flow entry, indicating that the match field matches a plurality of data flows, read theoretical traffic of the plurality of data flows corresponding to the match field in the flow information table.

For example, if a corresponding data flow can be found by using the match field, in this embodiment, two data flows whose flow sequence numbers are 2 and 3 can be found in the flow information table by using a match field "SrcIP: 10.0.0.2, DstIP: 10.0.0.3, . . . ", and theoretical traffic of the two data flows is m2 and m3.

In addition, when a corresponding data flow cannot be found by using the match field, in this case, a coefficient before the theoretical traffic m is set to 0, that is, 0*m, and subsequently, when an equation set is generated, m herein is expanded.

S20334. If it is determined that the flow entry is an aggregated flow entry, establish an equation by equaling a sum of theoretical traffic of the plurality of data flows that match the match field and that are in the switching device to the actual traffic, and then go to step S2034.

For example, if a corresponding data flow can be found by using the match field, in this embodiment, an equation m2+m3=c2 may be established by using a match field "SrcIP: 10.0.0.2, DstIP: 10.0.0.3, . . . ".

In addition, if a corresponding data flow cannot be found by using the match field "SrcIP:10.0.0.2, DstIP:10.0.0.3, . . . ", an equation 0*m=c2 is formulated.

S2034. The controller combines equations established based on a plurality of match fields, to generate the overdetermined equation set, where the theoretical traffic forms an unknown number vector of the overdetermined equation set, and the actual traffic forms a constant term vector of the overdetermined equation set.

It is assumed that in the foregoing steps, in addition to the two equations m1=c1 and m2+m3=c2 in the examples, a third equation 0*m=c3 and a fourth equation m3=c4 are obtained. In this case, the third equation 0*m=c3 is expanded to 0*m1+0*m2+0*m3=c3 based on the theoretical traffic m1, m2, m3 that can be found.

$$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = \qquad \text{formula (1)}$$

$$(c_1, c_2, c_3, \ldots, c_q)^T$$

a is a coefficient having a value of only 0 or 1, m represents the unknown number vector of the theoretical traffic, c represents the constant term vector of the actual traffic, p is a quantity of data flows, and q is a quantity of flow entry. Generally, q>=p.

Subsequently, the theoretical traffic m1, m2, and m3 of the fourth equations are used as an unknown number part of the equation set, and actual traffic c1, c2, c3, and c4 of all the equations are used as a constant term part of the equation set. The equation set is represented by AM=C in a form of vectors. A is a coefficient matrix of the equation set, M is an unknown number vector formed by the theoretical traffic, and C is a constant term vector formed by the actual traffic. For details, refer to formula (1). The foregoing four equations are represented as an equation set of a vector form:

$$\begin{pmatrix} 1 & 0 & 0 \\ 0 & 1 & 1 \\ 0 & 0 & 0 \\ 0 & 0 & 1 \end{pmatrix} \cdot (m_1, m_2, m_3)^T = (c_1, c_2, c_3, c_4)^T$$

Figure 8:
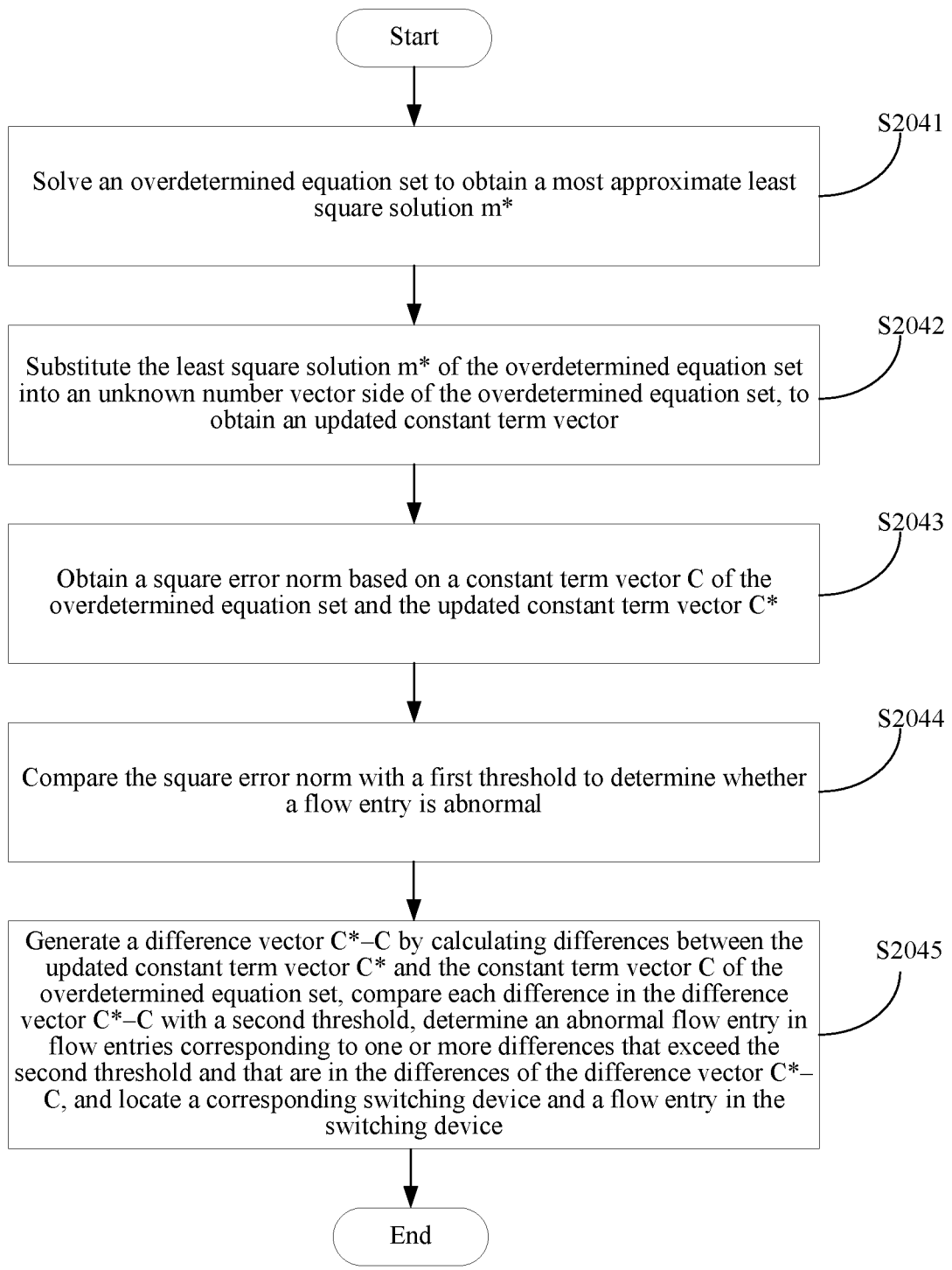
FIG. 8 is a schematic flowchart of determining whether at least one flow entry is abnormal based on an overdetermined equation set according to an embodiment of the present application.

S204. Determine, based on the overdetermined equation set, whether the at least one flow entry is abnormal. Specifically, referring to FIG. 8, step S204 includes steps S2041 to S2045.

S2041. Solve the overdetermined equation set to obtain a most approximate least square solution m*.

Because the overdetermined equation set has no fixed solution, the least square solution m* is obtained by solving the overdetermined equation set, and the least square solution m* is an approximate solution.

S2042. Substitute the least square solution m* of the overdetermined equation set into the unknown number vector side of the overdetermined equation set, to obtain an updated constant term vector C*.

That is, the obtained least square solution m* is substituted into the left side of the equation set shown in formula 1, to obtain a new vector C* of the equation set on the right side.

S2043. Obtain a square error norm ε based on the constant term vector C of the overdetermined equation set and the updated constant term vector C*, as shown in formula (2).

$$\varepsilon = \sqrt{\sum_{i=0}^{q} (c_i^* - c_i)^2} \qquad \text{formula (2)}$$

q is a quantity of flow entries, $c_i^*$ is one of C*, and $c_i$ is one of C.

S2044. Compare the square error norm with a first threshold to determine whether a flow entry is abnormal.

When the square error norm ε is greater than the first threshold, it is considered that an actual forwarding status in a network is inconsistent with a rule delivered by the controller, that is, a flow entry in the switching device is abnormal.

S2045. Generate a difference vector C*−C by calculating differences between the updated constant term vector C* and the constant term vector C of the overdetermined equation set, compare each difference in the difference vector C*−C with a second threshold, determine an abnormal flow entry in flow entries corresponding to one or more differences that exceed the second threshold and that are in the differences of the difference vector C*−C, and locate a corresponding switching device and a flow entry in the switching device.

Figure 9:
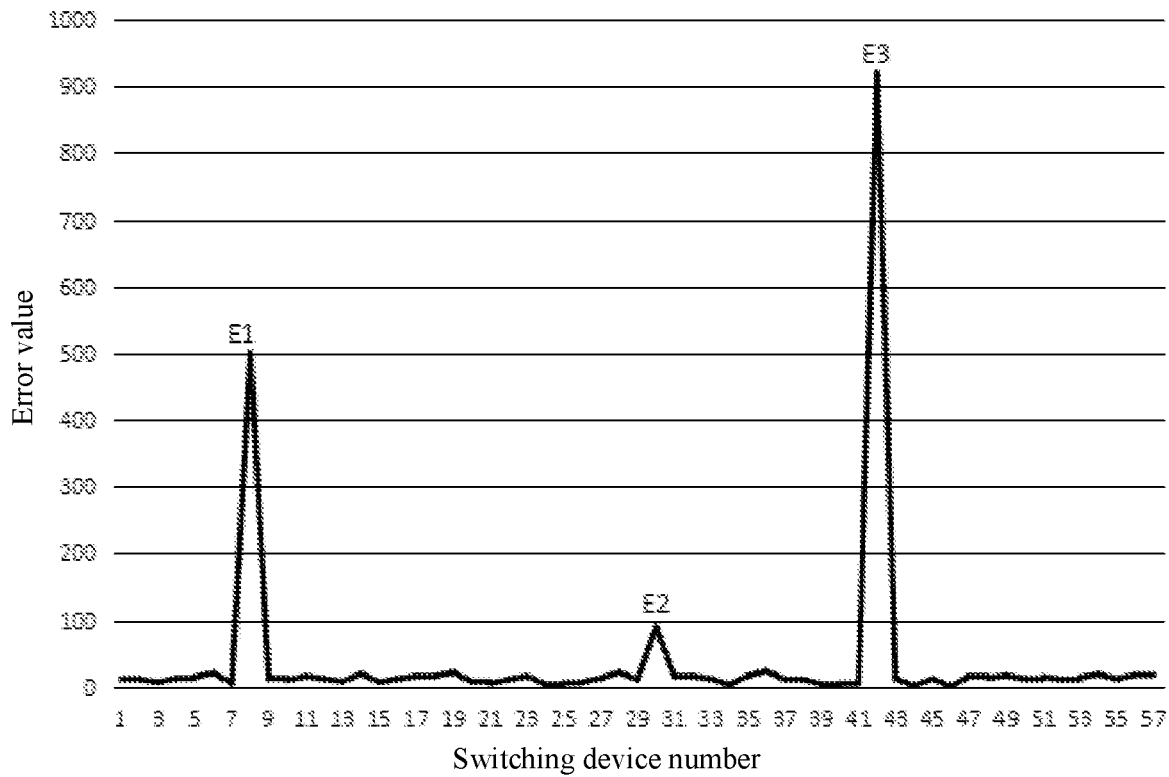
FIG. 9 is a schematic diagram of a flow entry abnormality simulation result according to an embodiment of the present application.

Specifically, referring to FIG. 9, FIG. 9 is a schematic diagram of an abnormality simulation result of a flow entry. A horizontal coordinate is a number of a switching device, and a vertical coordinate is a difference in the difference vector C*−C. It can be learned from the figure that differences E1, E2, and E3 corresponding to switching devices 8, 30, and 42 are relatively large, and it may be deduced that flow entries in the three switching devices may most probably be abnormal, so that a further check can be performed manually.

According to the data flow forwarding abnormality detection method provided in the present application, the controller determines the switching device through which the to-be-detected data flows; obtains the at least one flow entry that matches the data flow and that is in the switching device, where the flow entry includes the actual traffic and the match field, and the actual traffic is the value of the counter corresponding to the match field; establishes the overdetermined equation set based on the actual traffic and the theoretical traffic of the data flow that matches the match field and that is in the switching device, where the theoretical traffic forms the unknown number vector of the overdetermined equation set and the actual traffic forms the constant term vector of the overdetermined equation set; and determines, based on the overdetermined equation set, whether the at least one flow entry is abnormal. Based on the mathematical method in this embodiment of the present application, the match field in the flow entry delivered by the controller corresponds to a match field in a flow entry stored in the switching device, the theoretical traffic of the data flow in the switching device and the actual traffic are abstracted as the overdetermined equation set, the square error norm is obtained by using the least square solution of the overdetermined equation set, to determine whether the flow entry is abnormal, and an abnormal flow entry is located, thereby resolving a problem that detection needs to be performed when a data flow forwarding rule is inconsistent with an actual forwarding status of the data flow because the flow table is tampered with.

Figure 10:
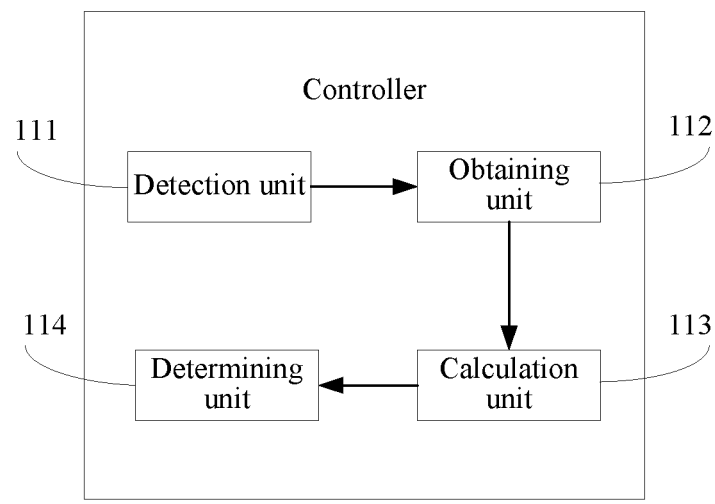
FIG. 10 is a schematic structural diagram of a controller according to an embodiment of the present application.

The present application provides a controller. The controller is configured to perform the foregoing data flow forwarding abnormality detection method. Referring to FIG. 10, the controller includes:

a detection unit 111, configured to determine a switching device through which a to-be-detected data flow passes;

an obtaining unit 112, configured to obtain at least one flow entry that matches the data flow and that is in the switching device, where the flow entry includes actual traffic and a match field; and the actual traffic is a value of a counter corresponding to the match field;

a calculation unit 113, configured to establish an overdetermined equation set based on the actual traffic and theoretical traffic of a data flow that matches the match field and that is in the switching device, where the theoretical traffic forms an unknown number vector of the overdetermined equation set and the actual traffic forms a constant term vector of the overdetermined equation set; and a determining unit 114, configured to determine, based on the overdetermined equation set, whether the at least one flow entry is abnormal.

Because the controller in this embodiment of the present application may be configured to perform the foregoing method procedures, for technical effects that can be obtained by the controller, refer to the foregoing method embodiments, and details are not described in this embodiment of the present application again.

In an example provided, the calculation unit 113 is further configured to:

substitute a least square solution of the overdetermined equation set into the unknown number vector side of the overdetermined equation set, to obtain an updated constant term vector;

obtain a square error norm based on the constant term vector of the overdetermined equation set and the updated constant term vector; and compare the square error norm with a first threshold to determine whether a flow entry is abnormal.

In an example provided, the determining unit 114 is further configured to:

generate a difference vector by calculating differences between the updated constant term vector and the constant term vector of the overdetermined equation set, compare each difference in the difference vector with a second threshold, and determine an abnormal flow entry in flow entries corresponding to one or more differences that exceed the second threshold and that are in the differences.

In an example provided, the flow entry further includes an aggregation flag, and the aggregation flag is used to indicate whether the flow entry is an aggregated flow entry; and the calculation unit 113 is further configured to:

determine, according to the aggregation flag, whether the flow entry is an aggregated flow entry;

establish, based on a determining result of the flow entry, an equation by equaling the theoretical traffic of the data flow that matches the match field and that is in the switching device to the actual traffic; and combine equations established based on a plurality of match fields, to generate the overdetermined equation set.

In an example provided, the calculation unit 113 is further configured to:

when a matched data flow can be found by using the match field, if it is determined that the flow entry is not an aggregated flow entry, indicating that the match field matches one data flow, establish an equation by equaling theoretical traffic of the data flow that matches the match field and that is in the switching device to the actual traffic; or if it is determined that the flow entry is an aggregated flow entry, indicating that the match field matches a plurality of data flows, establish an equation by equaling a sum of theoretical traffic of the plurality of data flows that match the match field and that are in the switching device to the actual traffic.

In an example provided, the calculation unit 113 is further configured to:

establish the overdetermined equation set as $$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = (c_1, c_2, c_3, \ldots, c_q)^T,$$

where a is a coefficient having a value of only 0 or 1, m represents the unknown number vector of the theoretical traffic, c represents the constant term vector of the counter, p is a quantity of data flows, and q is a quantity of flow entries.

Because the controller in this embodiment of the present application may be configured to perform the foregoing method procedures, for technical effects that can be obtained by the controller, refer to the foregoing method embodiments, and details are not described in this embodiment of the present application again.

It should be noted that the detection unit, the obtaining unit, the calculation unit, and the determining unit may be independently disposed processors, or may be integrated into a processor in the controller for implementation. In addition, the detection unit, the obtaining unit, the calculation unit, and the determining unit may be stored in a memory of the controller in a form of program code, and invoked by a processor of the controller to perform functions of the detection unit, the obtaining unit, the calculation unit, and the determining unit. The processor herein may be a central processing unit (English full name: central processing unit, CPU for short) or an application-specific integrated circuit (English full name: application specific integrated circuit, ASIC for short), or may be one or more integrated circuits configured to implement this embodiment of the present application.

Figure 11:
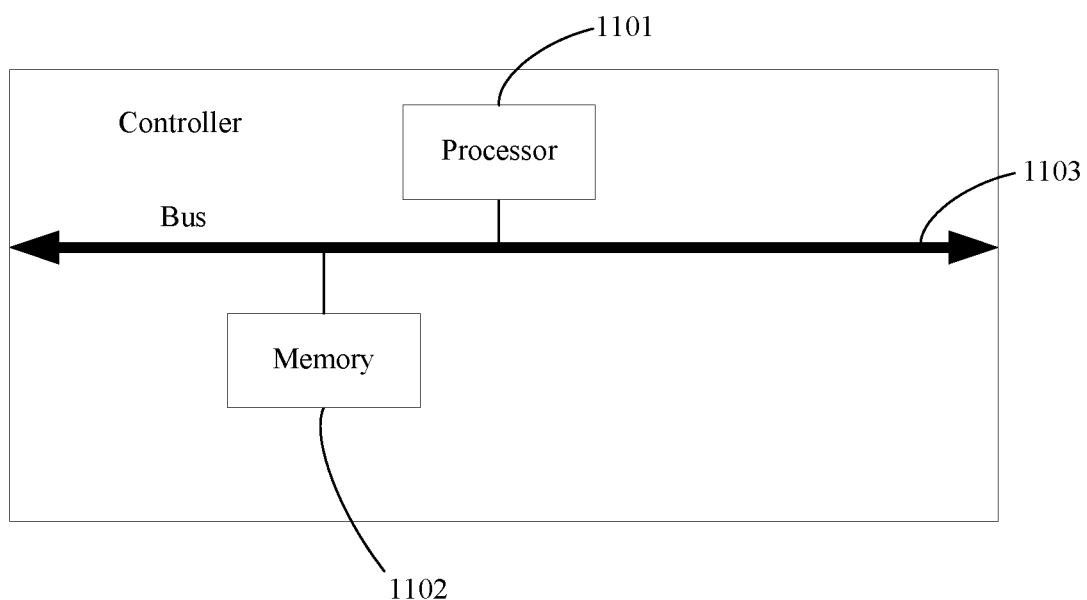
FIG. 11 is a schematic structural diagram of another controller according to an embodiment of the present application.

The present application provides a controller that is configured to perform the data flow forwarding abnormality detection method. Referring to FIG. 11, the apparatus may be a controller in an SDN network and may include a processor 1101, a memory 1102, and a bus 1103. The processor 1101 and the memory 1102 are connected and complete mutual communication by using the bus 1103.

It should be noted that the processor 1101 herein may be one processor, or may be a general term of a plurality of processing elements. For example, the processor may be a central processing unit CPU, may be an application-specific integrated circuit ASIC, or may be one or more integrated circuits configured to implement this embodiment of the present application, for example, one or more microprocessors like digital signal processor (DSP), or one or more field programmable gate arrays (FPGA).

The memory 1102 may be one storage apparatus, or may be a general term of a plurality of storage elements, and is configured to store executable program code, or parameters, data, and the like required for running of executable program code or an access network management device. The memory 1102 may include a random access memory (RAM), or may include a nonvolatile memory (NVRAM), for example, a magnetic disk storage or a flash memory (Flash).

The bus 1103 may be an industry standard architecture (ISA) bus, a peripheral component interconnect (PCIt) bus, an extended industry standard architecture (EISA) bus, or the like. The bus 1103 may be classified into an address bus, a data bus, a control bus, and the like. For ease of indication, the bus is indicated by using only one bold line in FIG. 11. However, it does not indicate that there is only one bus or only one type of bus.

The processor 1101 is configured to execute the program code stored therein, to perform the method provided in the foregoing method embodiments.

Specifically, the processor 1101 is configured to execute the program in the memory to perform the functions of the detection unit, the obtaining unit, the calculation unit, and the determining unit of the controller in the foregoing embodiments. Details are not described herein again.

The controller in this embodiment of the present application may be configured to perform the foregoing method process. Therefore, for a technical effect that can be obtained by the controller, refer to the foregoing method embodiments, and details are not described in this embodiment of the present application again.

A person of ordinary skill in the art may be aware that, the units and algorithm steps in the examples described with reference to the embodiments disclosed in this specification may be implemented by electronic hardware or a combination of computer software and electronic hardware. Whether the functions are performed in the form of hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   determining, by a controller, a switching device through which a to-be-detected data flow passes;
   obtaining at least one flow entry in the switching device that matches the to-be-detected data flow, wherein the at least one flow entry comprises actual traffic and a match field, and the actual traffic is a value of a counter corresponding to the match field;
   establishing an overdetermined equation set based on the actual traffic and theoretical traffic of a data flow in the switching device that matches the match field, wherein the theoretical traffic forms an unknown number vector of the overdetermined equation set, and the actual traffic forms a constant term vector of the overdetermined equation set; and
   determining, based on the overdetermined equation set, whether the at least one flow entry is abnormal,
   wherein the determining, based on the overdetermined equation set, whether the at least one flow entry is abnormal comprises:
   substituting a least square solution of the overdetermined equation set into an unknown number vector side of the overdetermined equation set, to obtain an updated constant term vector;
   obtaining a square error norm based on the constant term vector of the overdetermined equation set and the updated constant term vector; and
   comparing the square error norm with a first threshold to determine whether the at least one flow entry is abnormal.

2. The method according to claim 1, wherein the determining, based on the overdetermined equation set, whether the at least one flow entry is abnormal further comprises:
   generating a difference vector by calculating differences between the updated constant term vector and the constant term vector of the overdetermined equation set;
   comparing each difference in the difference vector with a second threshold; and
   determining one or more abnormal flow entries corresponding to one or more differences that exceed the second threshold.

3. The method according to claim 1, wherein:
   the at least one flow entry further comprises an aggregation flag, and the aggregation flag is used to indicate whether the at least one flow entry is an aggregated flow entry; and
   the establishing an overdetermined equation set based on the actual traffic and theoretical traffic of a data flow in the switching device that matches the match field comprises:
   determining, according to the aggregation flag, whether the at least one flow entry is an aggregated flow entry;
   establishing, based on a determining result of the at least one flow entry, an equation by equaling the theoretical traffic of the data flow in the switching device that matches the match field to the actual traffic; and
   combining equations, established based on a plurality of match fields, to generate the overdetermined equation set.

4. The method according to claim 3, wherein the establishing, based on a determining result of the at least one flow entry, an equation by equaling the theoretical traffic of the data flow in the switching device that matches the match field to the actual traffic comprises:
   when a matched data flow can be found by using the match field:
   if it is determined that the at least one flow entry is not an aggregated flow entry:
   indicating that the match field matches one data flow; and
   establishing an equation by equaling theoretical traffic of the data flow in the switching device that matches the match field to the actual traffic; or
   if it is determined that the at least one flow entry is an aggregated flow entry:
   indicating that the match field matches a plurality of data flows; and
   establishing an equation by equaling a sum of theoretical traffic of the plurality of data flows in the switching device that match the match field to the actual traffic.

5. The method according to claim 1, wherein the overdetermined equation set is $$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = (c_1, c_2, c_3, \ldots, c_q)^T,$$

a is a coefficient having a value of only 0 or 1, m represents the unknown number vector of the theoretical traffic, c represents the constant term vector, p is a quantity of data flows, and q is a quantity of flow entries.

6. A controller, comprising:
   at least one processor; and
   a non-transitory computer-readable storage medium coupled to the at least one processor and storing programming instructions for execution by the at least one processor, the programming instructions instruct the at least one processor to:
   determine a switching device through which a to-be-detected data flow passes;
   obtain at least one flow entry in the switching device that matches the data flow, wherein the at least one flow entry comprises actual traffic and a match field, and the actual traffic is a value of a counter corresponding to the match field;
   establish an overdetermined equation set based on the actual traffic and theoretical traffic of a data flow in the switching device that matches the match field, wherein the theoretical traffic forms an unknown number vector of the overdetermined equation set, and the actual traffic forms a constant term vector of the overdetermined equation set; and determine, based on the overdetermined equation set, whether the at least one flow entry is abnormal, wherein the programming instructions further instruct the at least one processor to:

substitute a least square solution of the overdetermined equation set into an unknown number vector side of the overdetermined equation set, to obtain an updated constant term vector;

obtain a square error norm based on the constant term vector of the overdetermined equation set and the updated constant term vector; and compare the square error norm with a first threshold to determine whether the at least one flow entry is abnormal.

7. The controller according to claim 6, wherein the programming instructions further instruct the at least one processor to:

generate a difference vector by calculating differences between the updated constant term vector and the constant term vector of the overdetermined equation set;

compare each difference in the difference vector with a second threshold; and determine one or more abnormal flow entries corresponding to one or more differences that exceed the second threshold.

8. The controller according to claim 6, wherein:

the at least one flow entry further comprises an aggregation flag, and the aggregation flag is used to indicate whether the at least one flow entry is an aggregated flow entry; and the programming instructions further instruct the at least one processor to:

determine, according to the aggregation flag, whether the at least one flow entry is an aggregated flow entry;

establish, based on a determining result of the at least one flow entry, an equation by equaling the theoretical traffic of the data flow in the switching device that matches the match field to the actual traffic; and combine equations, established based on a plurality of match fields, to generate the overdetermined equation set.

9. The controller according to claim 8, wherein the programming instructions further instruct the at least one processor to:

when a matched data flow can be found by using the match field:

if it is determined that the at least one flow entry is not an aggregated flow entry:

indicating that the match field matches one data flow; and establish an equation by equaling theoretical traffic of the data flow in the switching device that matches the match field to the actual traffic; or if it is determined that the flow entry is an aggregated flow entry:

indicating that the match field matches a plurality of data flows; and establish an equation by equaling a sum of theoretical traffic of the plurality of data flows in the switching device that match the match field to the actual traffic.

10. The controller according to claim 6, wherein the programming instructions further instruct the at least one processor to:

establish the overdetermined equation set as $$\begin{pmatrix} a_{11} & \cdots & a_{1p} \\ \vdots & \ddots & \vdots \\ a_{q1} & \cdots & a_{qp} \end{pmatrix} \cdot (m_1, m_2, m_3, \ldots, m_p)^T = (c_1, c_2, c_3, \ldots, c_q)^T,$$

wherein a is a coefficient having a value of only 0 or 1, m represents the unknown number vector of the theoretical traffic, c represents the constant term vector, p is a quantity of data flows, and q is a quantity of flow entries.

11. A system, comprising a controller, wherein the controller comprises:

at least one processor; and a non-transitory computer-readable storage medium coupled to the at least one processor and storing programming instructions for execution by the at least one processor, the programming instructions instruct the at least one processor to:

determine a switching device through which a to-be-detected data flow passes;

obtain at least one flow entry in the switching device that matches the data flow, wherein the at least one flow entry comprises actual traffic and a match field, and the actual traffic is a value of a counter corresponding to the match field;

establish an overdetermined equation set based on the actual traffic and theoretical traffic of a data flow in the switching device that matches the match field, wherein the theoretical traffic forms an unknown number vector of the overdetermined equation set, and the actual traffic forms a constant term vector of the overdetermined equation set; and determine, based on the overdetermined equation set, whether the at least one flow entry is abnormal, wherein the programming instructions further instruct the at least one processor to:

substitute a least square solution of the overdetermined equation set into an unknown number vector side of the overdetermined equation set, to obtain an updated constant term vector;

obtain a square error norm based on the constant term vector of the overdetermined equation set and the updated constant term vector; and compare the square error norm with a first threshold to determine whether at least one flow entry is abnormal.

12. The system according to claim 11, wherein the programming instructions further instruct the at least one processor to:

generate a difference vector by calculating differences between the updated constant term vector and the constant term vector of the overdetermined equation set;

compare each difference in the difference vector with a second threshold; and determine one or more abnormal flow entries corresponding to one or more differences that exceed the second threshold.

13. The system according to claim 11, wherein:
the at least one flow entry further comprises an aggregation flag, and the aggregation flag is used to indicate whether the at least one flow entry is an aggregated flow entry; and
the programming instructions further instruct the at least one processor to:
  determine, according to the aggregation flag, whether the at least one flow entry is an aggregated flow entry;
  establish, based on a determining result of the at least one flow entry, an equation by equaling the theoretical traffic of the data flow in the switching device that matches the match field to the actual traffic; and
  combine equations, established based on a plurality of match fields, to generate the overdetermined equation set.

* * * * *